United States Patent
Barnes et al.

[11] Patent Number: 6,069,594
[45] Date of Patent: May 30, 2000

[54] COMPUTER INPUT DEVICE WITH MULTIPLE SWITCHES USING SINGLE LINE

[75] Inventors: James Barnes, Campbell; Ron Mc Clure, Oakland, both of Calif.; David Glickman, Baltimore, Md.

[73] Assignee: Logitech, Inc., Fremont, Calif.

[21] Appl. No.: 08/706,515

[22] Filed: Sep. 4, 1996

Related U.S. Application Data

[63] Continuation of application No. 08/382,774, Feb. 2, 1995, abandoned, which is a continuation of application No. 07/737,074, Jul. 29, 1991, abandoned.

[51] Int. Cl.[7] .................................................. G09G 5/00
[52] U.S. Cl. ............................ 345/7; 345/158; 345/156
[58] Field of Search ................................ 345/156, 157, 345/158, 163, 7, 161; 74/471 XY; 381/122

[56] References Cited

U.S. PATENT DOCUMENTS

| | | | |
|---|---|---|---|
| D. 345,580 | 3/1994 | Carter et al. ........................ | D19/63 |
| 3,589,134 | 6/1971 | Hackmann ........................... | 61/96 |
| 4,321,851 | 3/1982 | Adachi ................................ | 84/1.01 |
| 4,397,211 | 8/1983 | Ferdinand ........................... | 84/1.26 |
| 4,414,438 | 11/1983 | Maier et al. ....................... | 200/6 |
| 4,439,649 | 3/1984 | Cecchi ............................... | 200/6 |
| 4,483,230 | 11/1984 | Yamauchi ........................... | 84/1.03 |
| 4,491,325 | 1/1985 | Bersheim ........................... | 273/148 B |
| 4,493,992 | 1/1985 | Geller ................................. | 250/221 |
| 4,501,424 | 2/1985 | Stone et al. ....................... | 273/148 |
| 4,514,600 | 4/1985 | Lentz ................................... | 200/5 |
| 4,543,562 | 9/1985 | Ny ....................................... | 340/365 |
| 4,543,563 | 9/1985 | Wine ................................... | 340/365 |
| 4,574,651 | 3/1986 | Nordstrom ......................... | 74/471 |
| 4,578,674 | 3/1986 | Baker et al. ....................... | 345/157 |
| 4,588,187 | 5/1986 | Dell .................................... | 273/1 E |
| 4,616,115 | 10/1986 | Potyka ................................ | 200/153 |
| 4,655,074 | 4/1987 | Robertson, Jr. ................... | 73/4 |
| 4,703,302 | 10/1987 | Hino et al. ........................ | 338/293 |
| 4,727,478 | 2/1988 | Endfield et aL. ................. | 364/200 |
| 4,739,128 | 4/1988 | Grisham ............................. | 200/6 A |
| 4,748,441 | 5/1988 | Brzezinski ......................... | 340/709 |
| 4,772,882 | 9/1988 | Mical ................................. | 340/709 |
| 4,788,537 | 11/1988 | Potiker .............................. | 340/710 |

(List continued on next page.)

OTHER PUBLICATIONS

Article entitled "Taking Control", Cameron Crotty, *PC Games Magazine*, Aug.–Sep. 1992, pp. 16–17.
Article from *Hardware Review*.
Article from *Army Times*, "Finding the 'joy' in a joystick", Grant Willis.
Article from *Strategy Plus*, Summer 1993.
Sourcebook of Electronic Circuits, Markus, McGraw–Hill, 1968.
The Art of Electronis, Horowitz & Hill, Cambridge University Press, 1990.
Positioning & Tracking Controls, Measurement Systems, Incorporated, Norwalk, Connecticut 06854, USA.
Thrustmaster "Flight Control System" Owner's Manual, Rev. 1.0–9/93PH, Thrustmaster, Portland, OR.
CH Products Brochure, "More Products", Vista Park, CA 92083.
"Warranty Information, Flightstick Quick–Start Instructions", CH Products Brochure, Vista Park, CA 92083.
Book entitled "Pro Audio 16: The Official Book", Luk & Golden, Osborne McGraw–Hill, 1994.

*Primary Examiner*—Richard A. Hjerpe
*Assistant Examiner*—Frances Nguyen
*Attorney, Agent, or Firm*—Townsend and Townsend and Crew LLP

[57] ABSTRACT

Apparatus and methods for providing positional and attitude information to a computer. An input device of the present invention comprises a controller, a transducer, and a mouse. In a 6D mode of operation, three-dimensional positional information with three degrees of freedom is provided to the computer. Multiple switches use an impedance ladder to provide multiple signals over a control line from a movable input device for a cursor or viewpoint on a display.

1 Claim, 10 Drawing Sheets

U.S. PATENT DOCUMENTS

| | | | |
|---|---|---|---|
| 4,804,940 | 2/1989 | Takigawa et al. | 341/133 |
| 4,852,031 | 7/1989 | Brasington | 364/578 |
| 4,868,780 | 9/1989 | Stern | 364/900 |
| 4,886,941 | 12/1989 | Davis et al. | 178/18 |
| 4,891,632 | 1/1990 | Chang | 340/710 |
| 4,906,843 | 3/1990 | Jones et al. | 250/221 |
| 4,910,503 | 3/1990 | Brodsky | 340/706 |
| 4,924,216 | 5/1990 | Leung | 340/709 |
| 4,927,987 | 5/1990 | Kirchgessner | 345/156 |
| 4,954,817 | 9/1990 | Levine | 340/706 |
| 5,043,709 | 8/1991 | Kim | 340/709 |
| 5,076,584 | 12/1991 | Openiano | 273/148 |
| 5,134,395 | 7/1992 | Stern | 341/20 |
| 5,159,159 | 10/1992 | Asher | 178/18 |
| 5,160,918 | 11/1992 | Saposnik et al. | 340/709 |
| 5,175,534 | 12/1992 | Thatcher | 340/706 |
| 5,225,831 | 7/1993 | Osborn | 341/20 |
| 5,245,320 | 9/1993 | Bouton | 345/167 |
| 5,252,970 | 10/1993 | Baronowsky | 341/20 |
| 5,253,836 | 10/1993 | Tso | 248/225 |
| 5,296,846 | 3/1994 | Ledley | 345/161 |
| 5,298,919 | 3/1994 | Chang | 345/163 |
| 5,389,950 | 2/1995 | Bouton | 345/156 | ns for computer by dragging across a flat surface.

COMPUTER INPUT DEVICE WITH MULTIPLE SWITCHES USING SINGLE LINE

This is a continuation of application Ser. No. 08/382,774, filed Feb. 2, 1995, now abandoned, which is continuation of Ser. 07/737,074 filed Jul. 29, 1991, now abandoned.

FIELD OF THE INVENTION

The invention relates generally to input systems for computers and, more particularly, a system for controlling a cursor on a video display of a computer.

BACKGROUND OF THE INVENTION

Users of a computer typically enter input using either a keyboard or a pointing device. The latter, which is of particular interest to the present invention, includes such well-known devices as mice, joy sticks, track balls, light pens, and the like.

The operation of "mice" is typical of pointing devices. Movement of a mouse, which is typically held in the user's hand, causes a position indicator (cursor) on a video display connected to the computer to move in relatively the same direction and magnitude. The mouse usually includes a pair of transducers which detect the movement of the mouse in two orthogonal directions; in turn, these motion signals are supplied to the computer. In addition, mice often include two or three keys which can be depressed for supplying additional signals to the computer, e.g., for selecting choices from a displayed menu.

There are two basic types of mice: mechanical and optical. Mechanical mice employ an inverted track ball or "rollerball" which is rolled across a desk or other planar surface by the user. Two rollers touching the ball record its movement along X and Y axes. As the rollers rotate, encoders make and break electrical contact and send corresponding electrical pulses that the computer can use to track movement. Alternatively, some mechanical mice forego the rollerball and instead employ two rollers which protrude from the bottom of the mouse to sense the X and Y directional movements directly. In either, case friction (mechanical) contact is made with a planar surface, with movement along that surface generating motion signals.

Optical mice, on the other hand, employ a special reflective mouse pad instead of a rollerball. An optical mouse has two LEDs that shine two light beams, one red and one infrared, onto the mouse pad. Reflected light beams re-enter the mouse through lenses which focuses the light onto photodetectors. As the mouse moves, the pad alternately absorbs and reflects light; blue lines on the pad absorb the red light while black lines absorb the infrared light. The photodetectors detect the "makes" and "breaks," which the mouse converts to signals for the computer.

An optomechanical mouse, a hybrid, employs both mechanical and optical means to detect movement. Like the mechanical mouse, the optomechanical mouse employs a rollerball. Instead of using electrical contacts, however, the optomechanical mouse uses two LED/photodetector pairs to detect movement along X and Y axes. As the roller rotates, the encoders alternately make and break light beams which shine between each LED/photodetector pair. Corresponding electric signals are sent to the computer to describe the motions of the mouse.

Regardless of the type, all of the foregoing mice generate motion signals by dragging a mouse device across a flat surface, such as a desk top. Commonly, a corresponding display cursor moves across the video display. Typically, though, the cursor tracks the relative movement of the mouse, not its absolute or physical movement. To allow the user to move the cursor with some precision, the ratio of mouse movement to cursor movement (mouse "sensitivity") is usually much less than one. In other words, a large mouse movement is mapped as a small cursor movement on the screen. This allows better fine motor manipulation of the cursor on the screen.

Occasionally, however, the user will want to move the cursor across a large screen distance, for example, from one side of the display to another. This is accomplished by "stroking" the mouse: repeatedly dragging the mouse across the desk top in a stroking fashion. In between each stroke (i.e., during back stroke), the mouse is lifted off the desk so that mechanical or optical contact is lost. Since no motion signals are generated during the reverse or back stroke, the cumulative effect is movement of the cursor in the stroke direction only.

In addition to the basic mouse design, a variety of other computer input designs are known. U.S. Patent No. 4,654,648, for example, describes a position control system having a wireless moveable "steering means" which emits acoustic signals, tracking means for receiving the acoustic signals and determining the position of the steering means by hyperbolic triangulation, and means for communicating the position of the steering means to a video display terminal. U.S. Pat. No. 4,578,674 describes a wireless cursor position device which operates by transmitting and receiving ultrasonic and infrared signals between the device and a control base. The control base includes an infrared emitter and at least two ultrasonic detectors; for three-dimensional (3-D) cursor control, additional ultrasonic detectors are required.

Cordless or wireless variants of input devices are known. U.S. Pat. No. 4,550,250, for example, describes a cordless input device which includes a pulse-driven light source whose duty cycle is controlled for conveying information. The detector has a housing with two spaced-apart optical slits for passing planes of infrared light onto concave light guides. The light guides, along with photoelectric sensors, produce positionally dependent, analog signals. The signals are processed by a microprocessor to determine the Cartesian coordinates of the device. U.S. Pat. No. 4,754,268 also describes a cordless input device. The cordless mouse indicates movement of the device on a planar surface by transmitting radiowaves to a host computer.

The keys of mouse devices have also been refined. U.S. Pat. No. 4,994,795, for example, describes a mouse input device having a plurality of programmable keys, with one embodiment including forty keys. A program controls the input device so that key signals are given priority. In the event that both key and motion signals occur, the key signals are supplied to the computer. If no key signal occurs, however, then motion signals are converted into key signals and are supplied to the computer.

While the prior art includes input devices having a variety of configurations (e.g., mouse, stylus, track ball, and the like) and means for communicating movement to a computer (including both cord and cordless models), the prior art input devices are largely confined to conveying two-dimensional (2-D) movement, i.e., movement along a planar surface. Of those systems which suggest a three-dimensional input device, the information conveyed to a computer is limited to positional information, i.e., the location of the device within an X, Y, and Z coordinate system.

SUMMARY OF THE INVENTION

According to the present invention, apparatus and methods are provided for detecting and communicating positional and orientation information to a computer. The invention is particularly useful for computer systems which require attitudinal input in addition to positional input within 3-D space.

The apparatus of the present invention is a position and orientation indicating device for use with a computer having a video display; the display conveys positional and attitudinal or orientation information from the input device to the user. The input device includes both transmitter and pointer (receiver) apparatus. In one embodiment, the transmitter device comprises three transducers for generating motion signals from a stationary location. The pointer apparatus, which includes at least three microphone elements for receiving the motion signals, is a user-held (or worn) pointer which may be moved in 3-D space.

Control circuitry, which is connected to both the transmitter and pointer devices, determines a position and attitude (i.e., angular orientation) of the pointer. In particular, the control circuitry determines the three-dimensional position as well as yaw, pitch, and roll from the time required (i.e., the propagation delay) for each motion signal to reach each of the pointer microphones.

The pointer device, which is in the form of a mouse device in one embodiment, may include a plurality of keys which may be activated for supplying user input to the device; these inputs are converted into signals and communicated to the computer.

Alternate embodiments of the present invention are also described. In one alternate embodiment, for example, the pointer device is in the form of a head tracker which may be worn on a user's head. In another embodiment, a plurality of pointer devices are provided for simultaneously tracking the position and attitude of several pointers in 3D space; pointers may be conveniently worn on the head and each hand of the user.

DESCRIPTION OF A PREFERRED EMBODIMENT

Figure 1A:
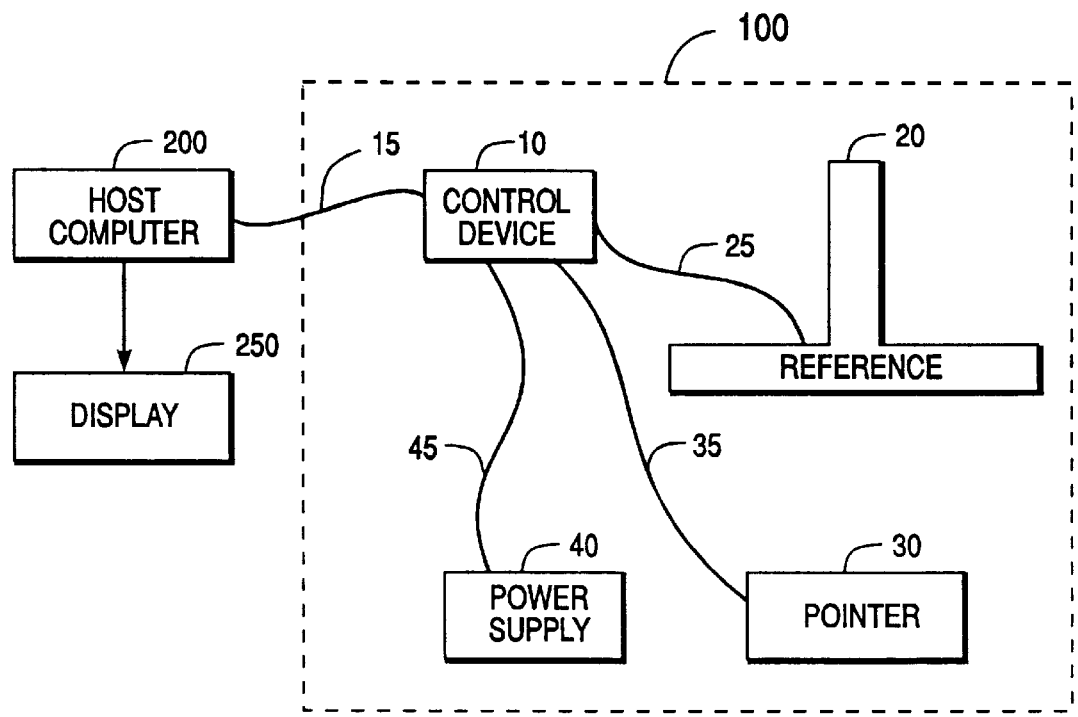
FIG. 1A is a block diagram of an input system constructed in accordance with the principles of the present invention.

Referring now to FIG. 1A, an input system 100 of the present invention comprises a control device 10, a stationary or reference frame 20, a pointer or mouse device 30, and a power supply 40. The control device 10 provides an interface between both stationary frame 20 and pointer or mouse 30 and a host computer 200. In particular, stationary frame 20 is connected to control device 10 via line 25, pointer 30 is connected to control device 10 via line 35, and control device 10, in turn, is coupled to the host computer 200 via line 15. Computer 200 provides information, such as a cursor position, to a user through display 250, which may be a CRT display or other output device. In a preferred embodiment, computer 200 is an IBM or IBM-compatible personal computer (available from International Business Machines, Armonk, N.Y.).

Figure 1B:
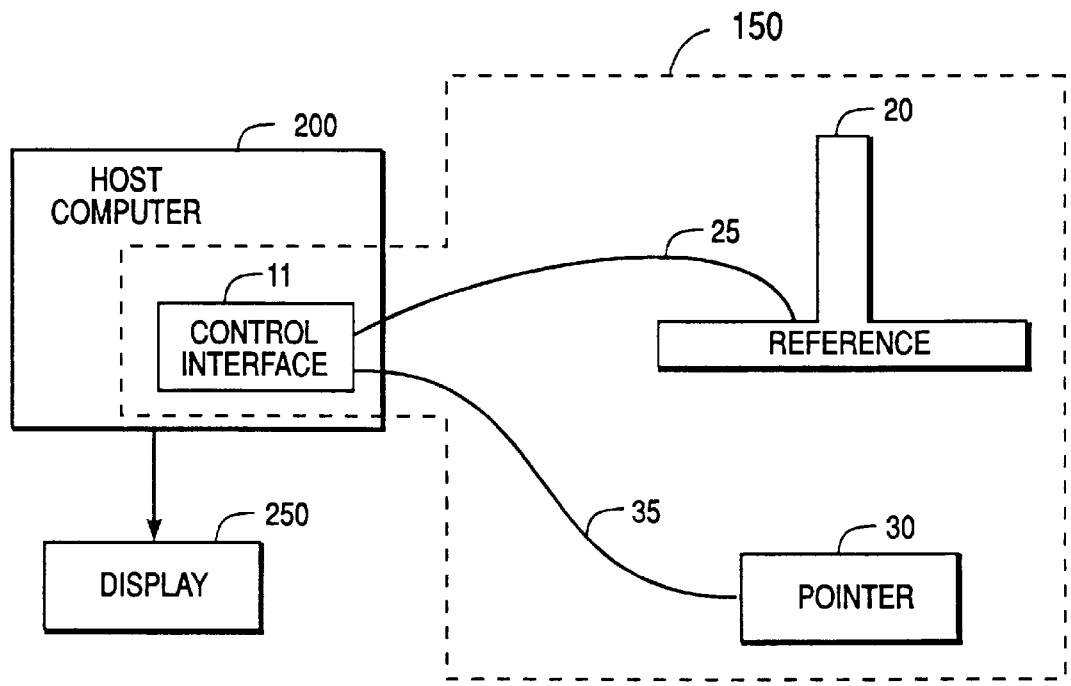
FIG. 1B is a block diagram of a second alternative embodiment of the present invention.

In FIG. 1B, a first alternative embodiment of the present invention is shown. In system 150, the control device 10 of system 100 has been replaced with a control interface 11. Specifically, control interface 11, which may be in the form of a bus card, connects reference member 20 and pointer 30 to the host computer 200 via line 25 and line 35, respectively. Control interface 11 is directly connectable to host computer 200 by a system bus (e.g., micro-channel, industry standard architecture (ISA), or extended industry standard architecture (EISA) or similar architecture).

Figure 1C:
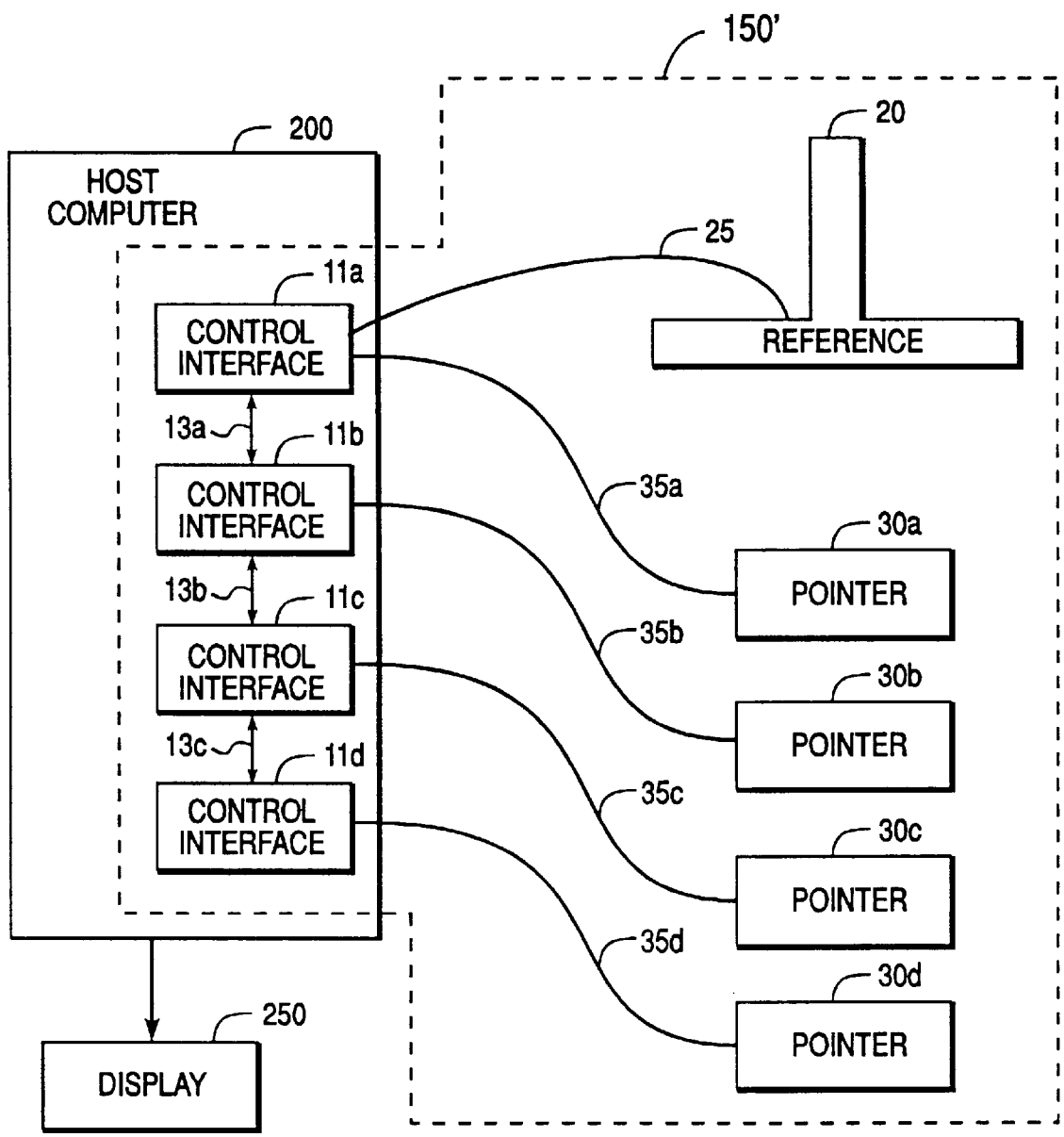
FIG. 1C is a block diagram of a third alternative embodiment of the present invention.

In FIG. 1C, a third alternative embodiment of the present invention is shown. System 150' includes the previously described components of system 150. In addition, system 150' includes a plurality of pointing devices, which may be any desired number of pointers. In an exemplary embodiment, the system 150' includes four pointers 30a, 30b, 30c, 30d which are connected to four interfaces 11a, 11b, 11c, 11d via lines 35a, 35b, 35c, and 35d, respectively. The interfaces 11a, 11b, 11c, 11d are interconnected or daisy-chained by intercard umbilical lines 13a, 13b, 13c.

Figure 2A:
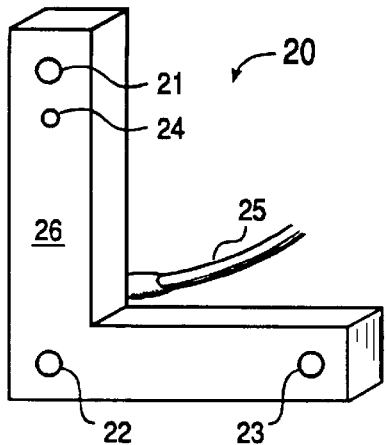
FIGS. 2A–B are perspective views of reference apparatus of the present invention.
Figure 2B:
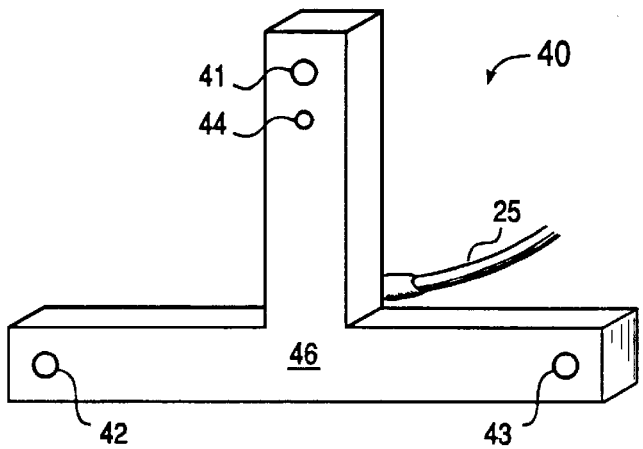

Referring now to FIGS. 2A–B, the stationary or reference frame 20 comprises a frame 26 having a plurality of spaced-apart transmitter sources 21, 22, 23 for generating signals which may be detected. In a preferred embodiment, the reference 20 is a transmitting device which includes three ultrasonic transducers (or piezo-electric speakers) capable of producing a short burst of acoustic cycles (e.g., 22.5 kilohertz) when activated.

Those skilled in the art will also appreciate that other sources, e.g., magnetic, electromagnetic, infrared, sonic, infrasonic, and the like, may be detected in accordance with the present invention. The use of ultrasonic transducers is particularly desirable, however, due to their low cost and widespread availability. Furthermore, ultrasonic transmissions are immune to radio frequency (RF) and other electromagnetic interferences which are common in a workplace setting.

As shown in the embodiment of FIG. 2A, reference 20 includes an "L"-shape frame 26 housing the three transducers 21, 22, 23 in a right-triangle configuration. Right transducer 23 and vertex transducer 22 are preferably mounted close to the work surface (i.e., table top) and tilted upward from about 20 to 40°, preferably about 25°; top transducer 21 is located directly over vertex transducer 22 and tilted upward at angle of 20° or less. When so configured, the system receives minimum sound reflections (and hence noise) from the work surface.

As shown, reference frame 20 also includes a calibration microphone 24 located a known distance from one of the speakers for calibrating the speed of sound in air in the user's environment (as described hereinbelow). To simplify the determination, microphone 24 is mounted at a known relative location for calibration with one of the speakers. As shown in the embodiment of FIG. 2A, microphone 24 is mounted near the top speaker 21 for calibration with the right speaker 23.

Alternate configurations exist for the reference member. As shown in FIG. 2B, for example, apparatus 40 includes a "T"-shaped frame having three spaced-apart transducers 41, 42, 43 arranged in an equilateral-triangular fashion (i.e., with each transducer at a vertex). Those skilled in the art will appreciate other configurations for the transmitter. For example, each of the transducer elements may be housed within its own independent structure such as that taught by U.S. Pat. No. 4,988,981 (applied to a plurality of receivers). Typically, the transmitter or reference apparatus will be fashioned in a configuration which is suitable for stationary use in the user's work area, e.g., a desk top.

Figure 2C:
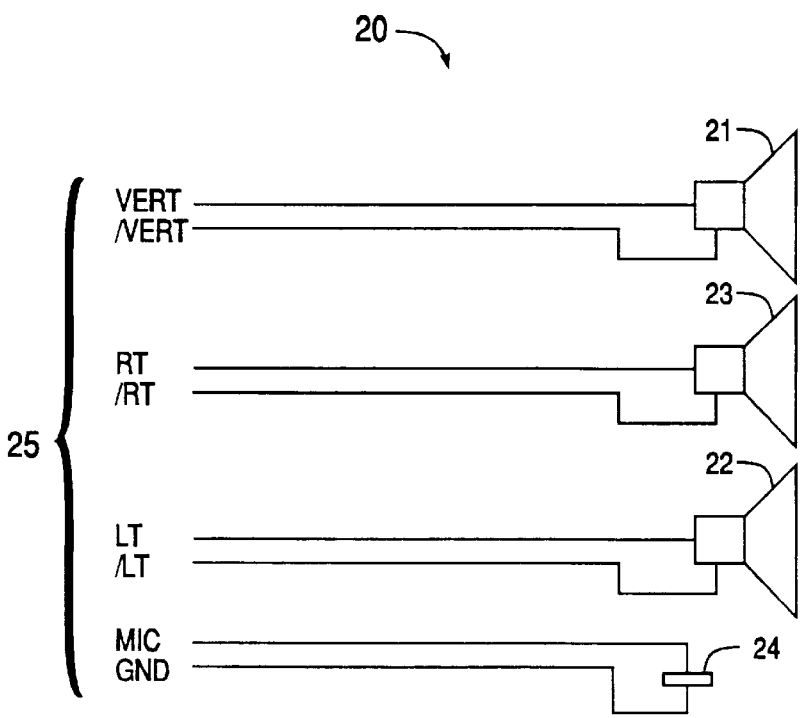
FIG. 2C is a schematic diagram of the reference apparatus of FIGS. 2A–B.

Referring now to FIG. 2C, a schematic of the transmitting reference 20 is shown. Each of the elements 21, 22, 23 comprises a piezo-electric transducer or speaker having separate input/output lines. Calibration microphone 24 is also provided with separate input/out lines. All lines are combined into the single line 25 which is connected to the control interface 10 (or 11).

Figure 3A:
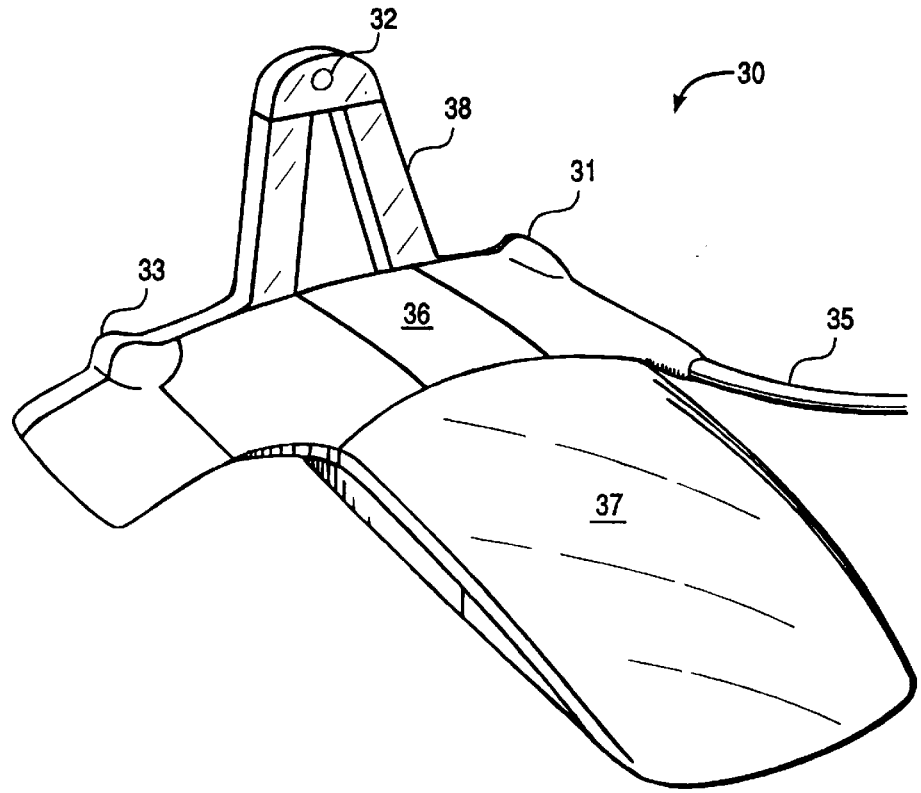
FIG. 3A is a perspective view of a hand-held pointer or mouse of the present invention.

Pointer 30, in contrast to the stationary reference transmitter, is a highly mobile device which may be held or worn by the user. In the embodiment of FIG. 3A, pointer 30 is a mouse or hand-held pointing device which includes a housing 37 having a plurality of user keys 36 and a plurality of detecting elements 31, 32, 33. Housing 37 is constructed of light-weight materials, such as plastics, and is fashioned into a shape which conforms to a user's hand.

As shown, mouse 30 includes user-activated switches or keys 36 disposed along the top or dorsal surface of housing 37, thus placing the keys at or near where a user's fingertips will lie. Keys 36 operate as switches or buttons which allow the user to communicate with the computer 200. Specifically, when activated by the user (e.g., by depressing with a finger), each key 36 transmits a signal to the host computer 200, which may then be acted upon by application and/or system software. Each signal may be predefined or user defined to emulate user functions or key strokes. Each key or pointer button can be actuated independently or in any combination with other key(s). Additional signals may be generated by the keys 36 using "double clicking" and "dragging" (click and holding) techniques, which are known in the art.

In a preferred embodiment, keys 36 includes at least five mouse buttons, with three buttons emulating a Logitech three-button mouse and two supporting additional input (e.g., "continue" and "suspend" described hereinbelow). Alternatively (in the same or an alternate embodiment), two of the keys 36 provide Microsoft mouse emulation. Signals generated by the key(s) are communicated to control device 10 (or control interface 11) via line 35. Techniques for transmitting and receiving signals from mouse buttons, such as the keys 36, are known in the art; see, e.g., *Microsoft Mouse Programmer's Reference*, Microsoft Press, 1989.

Offered for purposes of illustration and not limitation, apparatus and techniques for transmitting and receiving mouse data ("mouse record"), including both key and motion signals, are presented in Appendix A. Additional apparatus and techniques, including methods for transmitting and receiving attitudinal orientation information in accordance with the present invention, are presented in Appendix B.

The pointer or mouse 30 also includes detecting elements 31, 32, 33 in the form of microphones for receiving acoustic signals from the reference frame 20, as well as for receiving speech, voice commands, and/or other sound input from the user. In a preferred embodiment, mouse microphones 31, 32, 33 are three omni-directional microphones which are disposed on the housing 37 in an equilateral-triangular fashion (i.e., so that no one angle exceeds 90°). While omni-directional, each microphone should have an unobstructed "line of sight" or view of the reference 20 when the pointer 30 when held in the user's hand. When used for audio input (e.g., for push-to-talk operation, described hereinbelow), one or more microphones will be aimed in the general direction of the audio source, such as the user's mouth.

As shown in the embodiment of FIG. 3A, microphones 31, 32, 33 may be disposed substantially along one face, e.g., a forward or anterior face, of the mouse 30. To improve detection of the transducer sources, however, the three microphones are not arranged co-linear in a preferred embodiment. As illustrated, microphone 32 is offset from the other two microphones, which lie substantially co-planar with the top of the housing 37, so that an equilateral triangle lying in a vertical plane is defined by the three microphone elements 31, 32, 33. In a preferred embodiment, the three microphones 31, 32, 33 will lie in a vertical plane when the mouse 30 is at rest (e.g., on a desk top), thus simplifying the calculation of mouse information (described in further detail hereinbelow).

Figure 3B:
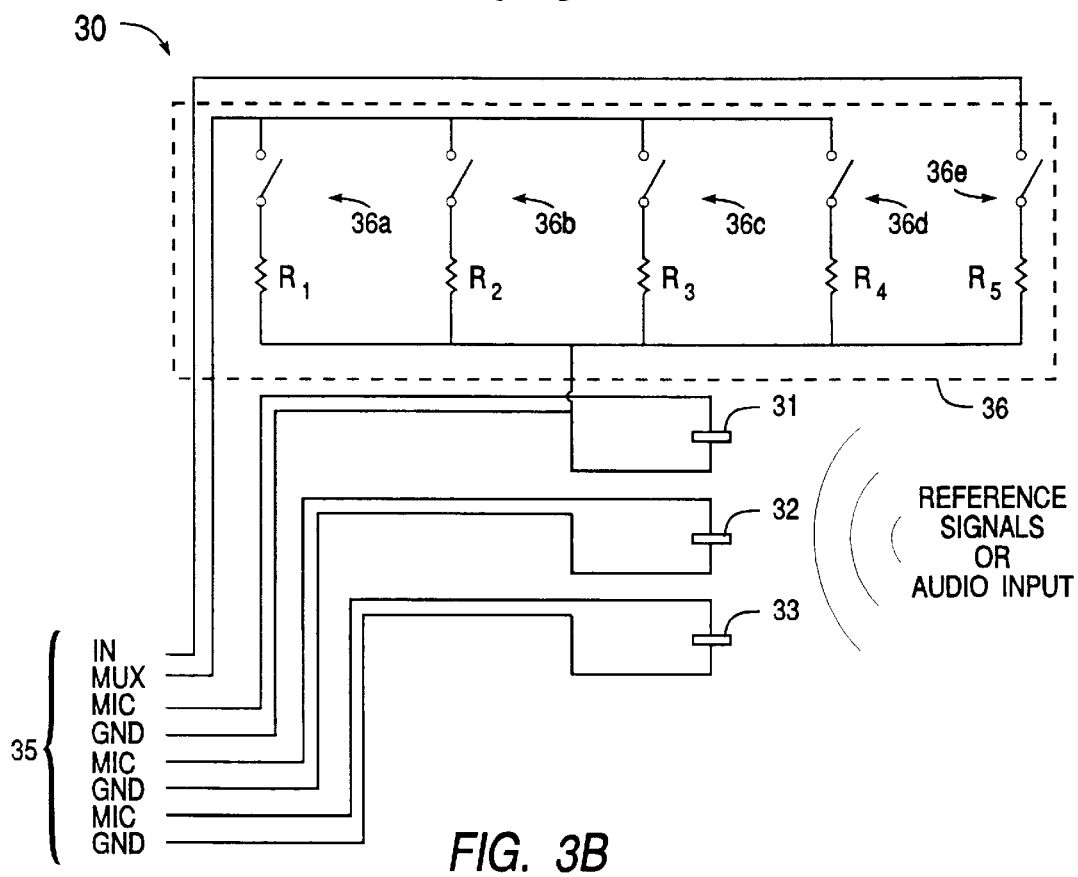
FIG. 3B is a schematic diagram of the pointer of FIG. 3A.

Referring to FIG. 3B, a schematic diagram of the mouse 30 is shown. Keys 36 comprise a plurality of switches, such as switches 36a–e. By providing each switch with a resistor (e.g., $R_{1-5}$) which has a unique resistance and which provides a unique sum resistance when added to others resistors, various combinations of keys or switches 36 may be determined. As shown, one switch (e.g., switch 36e) may serve as a master switch. Also shown in FIG. 3B, are the microphones 31, 32, 33, each having separate input and output lines. One of the microphone elements (or more), such as microphone 31, may also be coupled to the switches (e.g., by a ground line) for switch-activation of that element. All input/output lines of the keys 36 and microphone elements 31, 32, 33 are combined into the single line 35, which may be connected to the interface 10 (or 11).

While the foregoing discussion of the reference and pointing components of the present invention presents a stationary transmitting reference and a moveable receiving pointer, those skilled in the art will readily appreciate that the stationary reference may instead include detectors or receivers (e.g., microphone disposed on a stationary desktop frame) while the pointer is a mobile transmitter device (e.g., a pointing device having transducers). In this alternate configuration, elements 31, 32, 33 of pointer 30 are instead three spaced-apart transmitters, such as ultrasonic transducers. In this case, elements 21, 22, 23 of frame 20 (or elements 41, 42, 43 of frame 40) are three spaced-apart detectors, such as omni-directional microphones. With either configuration, the system 100 can accurately determine the position and attitude of pointer 30 relative to stationary reference 20.

The operation of system 100 will now be described. In the following discussion, stationary device 20 will serve as the transmitting member, and the pointing device or mouse 30 will function as the receiving member. Those skilled in the art will appreciate the operation of the complimentary configuration, i.e., system 100 with stationary device 20 serving as the receiving member and the pointer 30 as the transmitting member. Furthermore, the discussion of operation of system 100 is also applicable to system 150 and 150'.

In operation, system 100 uses the propagation delay of sound to perform position determinations. In particular, the system 100 measures the time of delay for sound to travel from each of the three speakers 21, 22, 23 to the three microphone elements 31, 32, 33 positioned on mouse 30. From this delay information and the speed of sound in air (calibrated for that time and location), input system 100 (or 150) determines the position and attitude of the mouse 30 with respect to the transmitter apparatus 20.

Figure 4:
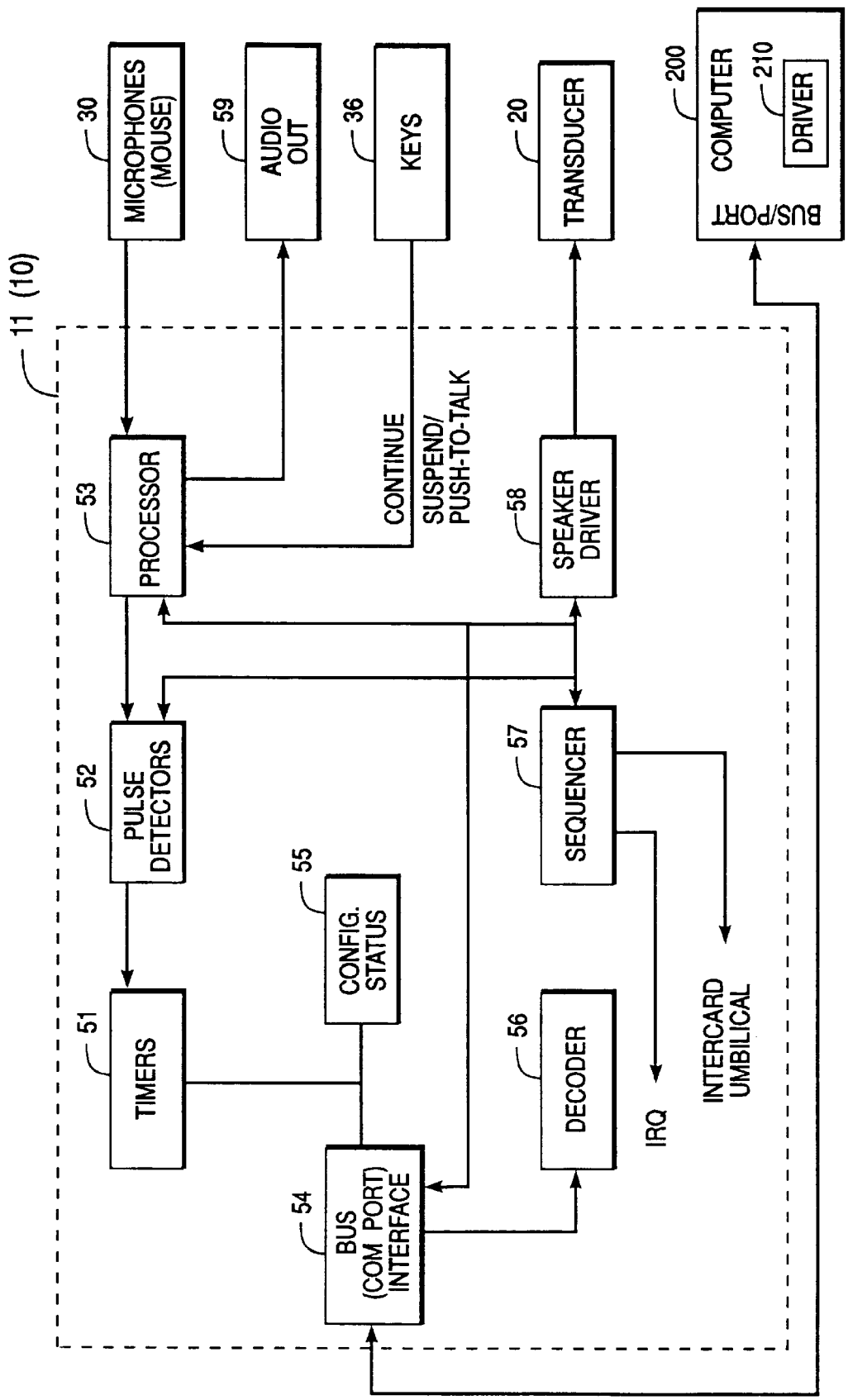
FIG. 4 is a block diagram of a control circuitry of the present invention.

Referring now to FIG. 4, the function and construction of control interface 11 will be described. (Interface 10 operates in a like manner but communicates with computer 200 through a communication port, e.g., a RS232 or SCSI, instead.) Control interface 11 provides apparatus and method for accurately measuring the distance from a speaker (e.g., speakers 21, 22, 23) to a microphone (e.g., mouse microphones 31, 32, 33 or transducer microphone 24).

As shown, control interface 11 interacts with reference 20, pointer 30, and a device driver 210 stored in host computer 200. During power on, interface 11 or 10, under control of driver 210, initializes and enables mouse 30, transducer 20, and control interface 11. Next, the first of three speakers (e.g., transducers 21, 22, 23) is selected. Control interface 11 measures the time required for sound to propagate to each of the three microphones (e.g., microphones 31, 32, 33). When sound is detected, a software interrupt is generated by apparatus 11 which may be read by the driver 210. Driver 210, which may be a software device driver or firmware (e.g., ROM, EPROM, or the like), reads the generated interrupt and the timer values for each of the four microphone elements (e.g., calibration microphone and three mouse microphones). The process is then repeated for each of the remaining speakers, with the driver 210 computing the current speed of sound and the position and attitude of the pointer or mouse. This information, in turn, is provided to computer 200 for use by application and/or operating system programs.

Control interface 11 comprises timers 51, pulse detectors 52, processor 53, bus interface 54, configuration status 55, decoder 56, sequencer 57, and speaker driver 58 and audio out 59. Connection to computer 200 is through bus interface 54, which includes a 8/16-bit bus adapter as is known in the art. Interface 54 may occupy one of the selectable device locations (e.g., serial ports COM1–COM4, or parallel ports LPT1–LPT2), with the associated device interrupt request (IRQ) provided by sequence 57 (e.g., by user-selectable jumper). For a general discussion of device locations, device drivers, and software/hardware interrupts in an IBM Personal Computer, see *IBM Technical Reference* (International Business Machines, Armonk, N.Y.), or *Programmer's Guide to the IBM PC*, Microsoft Press, 1985.

In operation, control interface 11 stimulates each speaker element and starts a counter for each of the microphones. Particularly, driver 58 under control of the speaker driver 58 stimulates transducers 20. Processor 53 "listens" for the sound from the speaker to arrive at each microphone 30; each counter or timer 51 is stopped when a particular sound is detected at its corresponding microphone. Since the speed of sound in air varies with environment (according to ambient temperature and barometer pressure), the control interface 11 measures the current speed of sound each time the position of the pointer or mouse 30 is calculated. By measuring the amount of time required for sound to travel a known fixed distance (e.g., between speaker 23 and microphone 24), the speed of sound may be determined.

Bus interface 54 is connected to the configuration/status registers 55 and to two timer chips 51, each of which contains three sixteen-bit timers. At any one time, only one of the two timers is selected as active (by setting a corresponding bit in the configuration register 55). Bus interface 54 also includes an eight-bit data bus buffer and a sixteen-bit address decoder. An equality comparator is provided to detect the address bits which do not change based upon jumper selection. A GAL chip is used to decode the remaining address bits based upon jumper selection.

Timers 51 includes a pair of 82C54 timer chips (available from Intel Corporation of Santa Clara, Calif.) which provide timers for the four microphones and clocking for the speaker drivers; timing sequence is provided by sequencer 57. In a preferred embodiment, the timers 51 include clock rates up to 10 megahertz.

Control sequencer 57 is provided by a GAL Chip (such as a GAL 16V8A chip available from Lattice Semiconductor Corporation of Hillsboro, Oreg.) which is responsible for providing timing sequence. The GAL can track many pointer devices in front of one transducer frame. The GAL also provides the "sample" and "dump" signals used by analog processing 52.

Control 10 and 11 also receives and processes the signals from keys 36. In turn, the signals are provided to computer 200 through interface 54. In addition, processor supplies audio information (from the mouse 30) to audio out 59, which may be in the form of a standard DIN jack. Alternatively, audio may be supplied to the computer 200 through interface 54.

The operation of control 10 and 11 are set forth in further detail in Appendix C. Moreover, a method for determining position and attitudinal information from a pointing device in 3-D space is disclosed in co-pending application Ser. No. 07/601,942, now assigned to the assignee of the present case, the disclosure of which is hereby incorporated by reference.

User operation of system 100 will now be described. System 100 provides two-dimensional and three-dimensional operating modes. In the two-dimensional or "2D" operating mode, the mouse 30 operates as a conventional mouse, reporting two-dimensional positions on a desk top plane; in this mode, the mouse 30 is compatible with Logitech (Fremont, Calif.) and Microsoft (Redmond, Wash.) pointing devices. The "6D" mode, the alternative mode, permits six degrees of freedom (i.e., reporting three-dimensional positions with three rotational orientations within a three-dimensional space).

Figure 5:
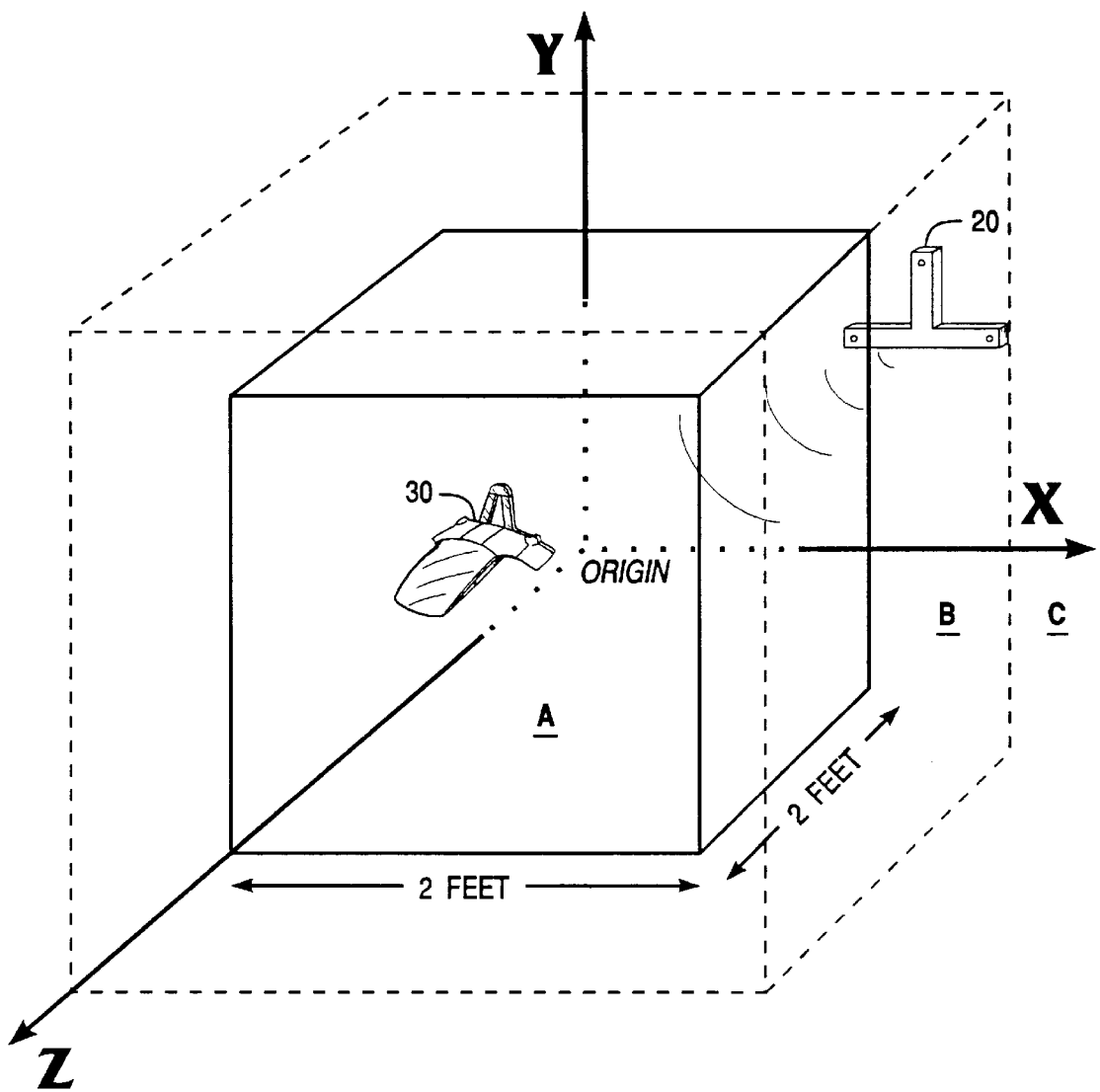
FIG. 5 is a diagram illustrating an active area within a virtual space which the device of the present invention may operate.

Referring now to FIG. 5, the "6D" mode is illustrated. The mode provides three-dimensional (X, Y, Z) positional information and attitude information, including pitch, yaw, and roll. As shown, the X, Y, Z rectangular (Cartesian) coordinate system is used as the three-dimensional coordinate system of a preferred embodiment.

A zone or "active area", shown as Space A, is provided in front of reference 20 in which pointer 30 may move. The active area A is the zone or space in which maximum tracking resolutions (e.g., 400 dpi) are maintained. Movement outside the active area A, causes the pointer 30 to enter a fringe area B. Movement of the pointer 30 within the fringe area B is still tracked by the system 100, but at a lower resolution. Movement of the pointer 30 outside of the fringe area B (i.e., into space C) is clipped.

Visual feedback of movement within the different zones may be provided by displaying differently shaped or colored cursor icons on the display 250. For example, while the pointer 30 is within the active area A, a green cursor may be displayed. When the pointer 30 moves into the fringe area B, a yellow cursor may be displayed. Movement of the pointer 30 into the clipped zone C, causes a red cursor to be displayed. By analogy, space A resembles the normal playing area of a baseball diamond, zone B is similar to the warning track in baseball, and zone C serves as a fence, beyond which no action can be taken.

In one embodiment, the active area includes a cube of approximately two feet in width, with an additional 8 inch fringe area; the center of the cube is the origin of space for the mouse, leaving one foot of high-resolution tracking in each direction (x, y, and z). In an alternate embodiment (e.g., system 300 discussed hereinbelow), the active area includes a seven-foot cube. Those skilled in the art will appreciate that other "active areas," having different sizes and/or configurations, may be provided.

Referring now to FIGS. 6A–D, the tracking and representation of attitude or rotational information of the present invention will now be described. Rotation is defined as follows:

1) Pitch is rotation about the X axis.
2) Yaw is rotation about the Y axis.
3) Roll is rotation about the Z axis.

Figure 6A:
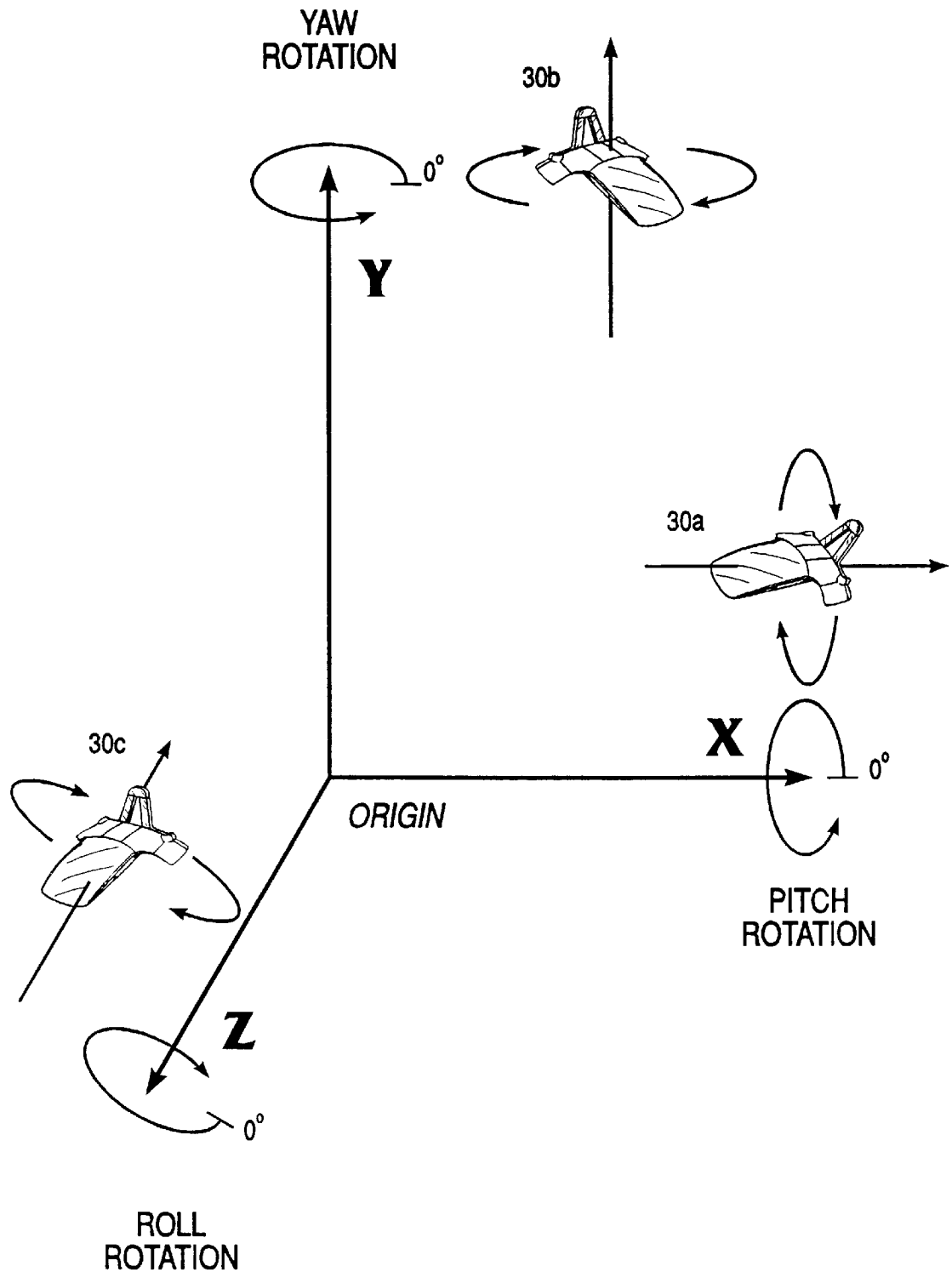
FIGS. 6A–D is a diagram illustrating the positional and attitude information which may be processed and communicated by the device of the present invention.
Figure 6B:
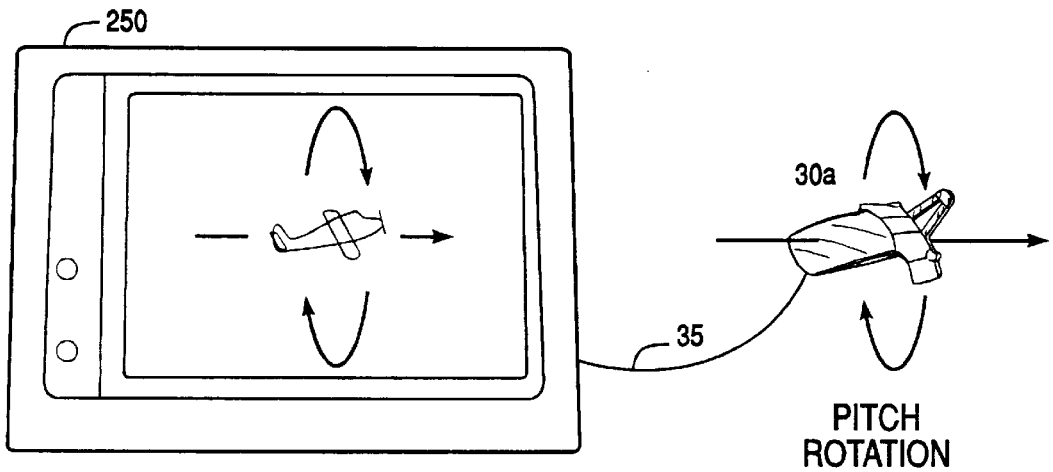
Figure 6C:
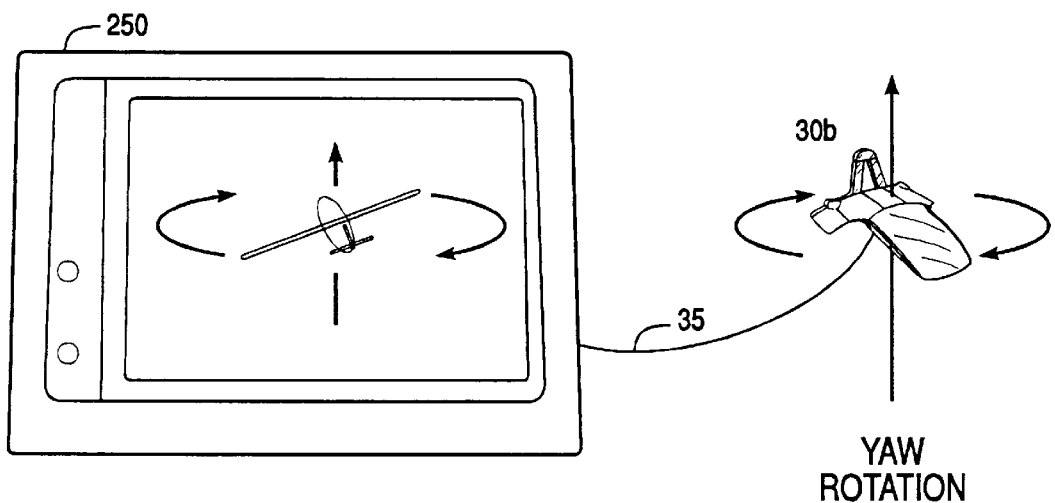
Figure 6D:
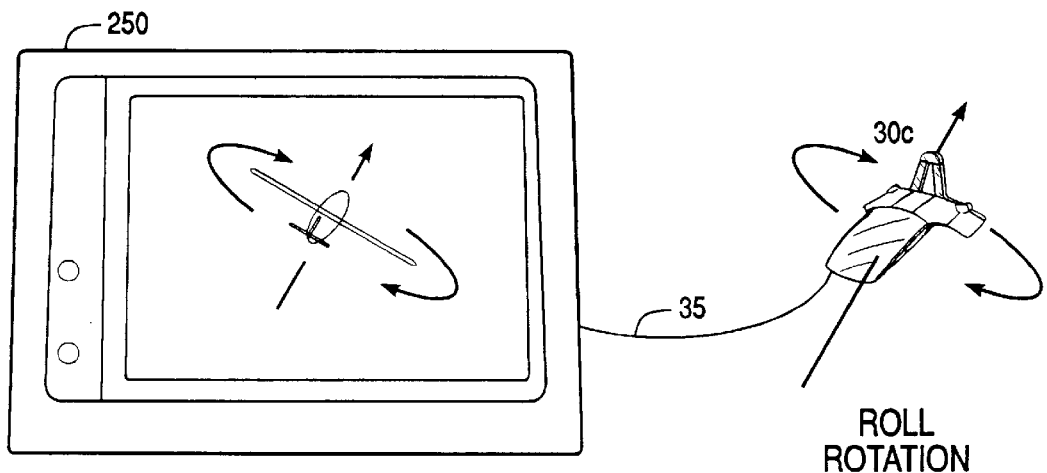

Positive directions are defined by the right-hand rule (indicated by corresponding arrows). As shown in FIGS. 6B–D, 6D-mode information may be processed by computer 200 for display to the user via display 250.

The orientation for rotation may be relative to the pointer or to the reference frame; alternatively, the orientation may be global. When relative to the mouse (i.e., Local Euler mode), rotations are determined from the mouse's viewpoint. If the user points the mouse directly at the transducer and rocks one of its ends up and down (i.e., changes the mouse's angular relation to its X axis), the user is affecting the pitch angle. If the user then rotates the mouse 90 degrees to the right and then rocks it up and down, the user is affecting the yaw angle (not the pitch angle). In this mode, the orientation of the mouse 30 duplicates that of a pilot in an aircraft. When a pilot is flying a plane upside down and pushes the control stick forward, for example, the pilot wishes to go "down" from his or her perspective (which is actually "up" relative to the horizon).

Further description of the local Euler mode and other orientation modes (including Global Euler and Quaternions modes) is set forth in Appendix B, at pages 15–17.

Besides receiving positional (and in the case of 6D mode, attitude information), system 100 also receives user input from keys 36. In a preferred embodiment, at least one signal of the keys 36 will cause continuation of the current mouse movement. If the user is moving the mouse 30 forward, for example, the user may activate a key for continuing this forward movement regardless of how the mouse itself now moves. The continuing function may be applied to position movements, rotations, or both. The direction to continue may be determined to be the same direction as the mouse is facing (i.e., the mouse's viewpoint). Alternatively, the direction may be determined from a vector constructed from the last two mouse samples, or constructed from an average of a selected number of mouse samples. The "continue" function operates in either 2D or 6D mode.

Complementing the "continue" key, in a preferred embodiment, at least one signal of the keys 36 will cause reversal of the current mouse movement. If the user is moving the mouse 30 forward, for example, the user may activate a "backward" key for continuing the movement in a reverse direction, regardless of how the mouse itself now moves.

Despite having a finite "active area" in which to move a pointer device, system 100 also provides the user a method and apparatus for traversing large virtual or screen distances. Unlike conventional 2-D mice, a 3-D mouse cannot be simply "stroked" on a desk top for traversing large screen distances (as described in the Background). According to the present invention, at least one of the signals of keys 36 includes a "suspend" apparatus for ignoring position movements, rotations, or both. Thus, mouse 30 may be repeatedly "stroked" across the active area, with the suspend apparatus invoked during the back stroke phase. In effect, mouse 30 may be moved large virtual distances regardless of the size of the active area. The "suspend" function operates in either the 2D or 6D mode.

Also, keys 36 activate a "push-to-talk" feature. In particular, at least one signal of the keys 36 will activate a mouse microphone (e.g., microphone 31, microphone 32, and/or microphone 33) to receive audio input from the user. The operation of the key may resemble that of a dictation machine, with audio received in response to one signal and halted in response to another signal; alternatively, one signal may serve as a toggle.

The push-to-talk feature is particularly advantageous when used with voice recognition and multimedia applications. If more than one mouse microphone is activated, stereo audio input may be received by the mouse 30. Audio input received by the mouse is supplied to the control interface 11, and in turn supplied to the computer 200 and/or the audio out 59 (of FIG. 4).

In a preferred embodiment, the "push-to-talk" feature is operably coupled to the "suspend" feature as follows. Activating the push-to-talk signal or mode also invokes the suspend mode. In operation, as the computer 200 is executing an application, such as a multimedia application, the user may invoke press-to-talk for entering audio input, while at the same time suspending or freezing other input (e.g., graphic input).

The continuing, suspend, and push-to-talk functions may be controlled by the device driver 210. In response to a continue signal from keys 36, for example, driver 210 continues to supply current mouse information to computer 200. In response to a suspend signal from keys 36, on the other hand, driver 210 temporarily suppresses the transmittal of mouse information to computer 200. similarly, driver 210 provides audio input depending on the status of the push-to-talk button.

Figure 7:
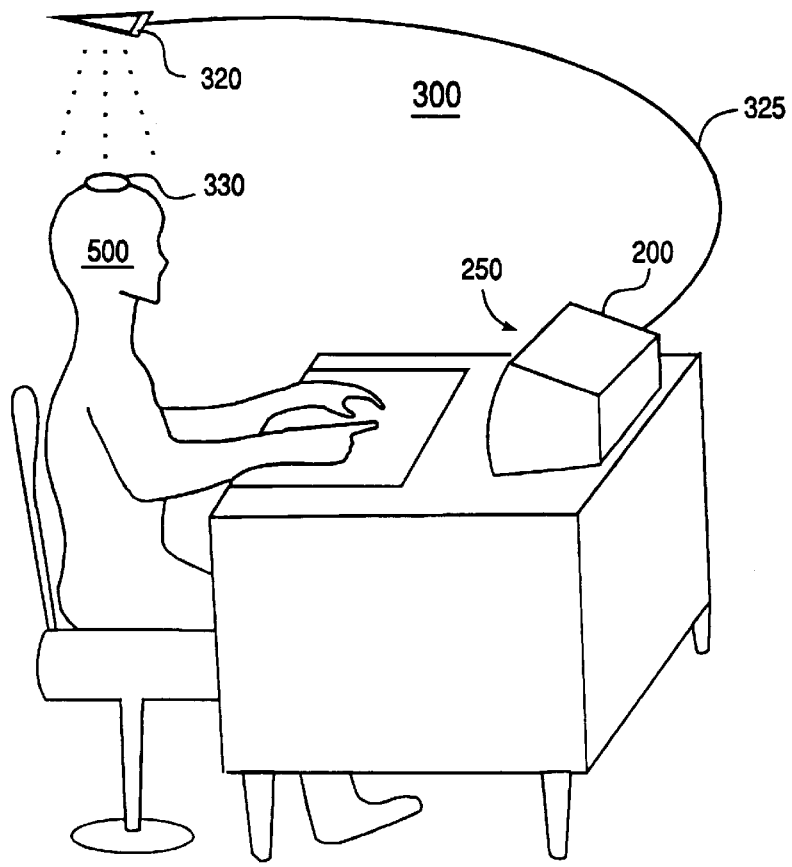
FIG. 7 is a lateral view of another embodiment of the present invention which includes a head tracker.
Figure 8:
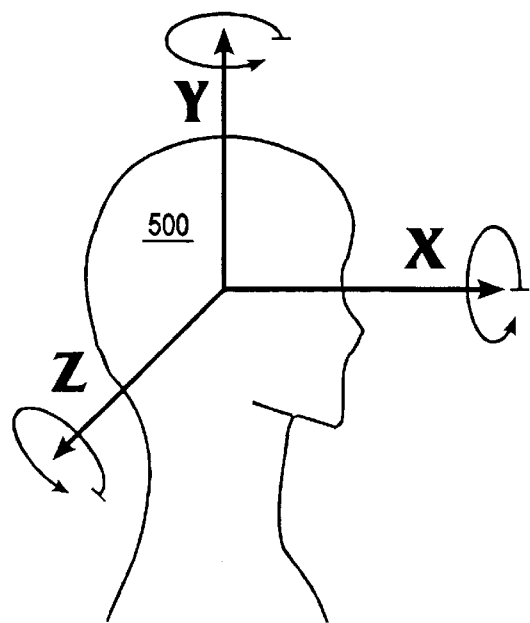
FIG. 8 is a diagram illustrating the positional and orientation information which may be processed and communicated by the embodiment of FIG. 7.

Referring now to FIG. 7–8, an alternative embodiment of the present invention is described. In particular, an embodiment is provided in which other body parts (e.g., head), in addition to hands, are used for input. Input device 300 includes a head tracker 330 for receiving acoustic signals from transducer 320 which is coupled to computer 200 (and display 250) through line 325. Head tracker 330 includes a plurality of microphone elements, such as the three omni-directional microphones of mouse 30. As shown, tracker 330 may be worn like a hat, with the microphone elements substantially facing upward. In this embodiment, tracker 330 may include a display (e.g., LCD or CRT display 250) positioned within the user's field of view.

The transmitter apparatus 320 includes at least three ultrasonic transducers with a calibration microphone, such as those described for the transmitter apparatus 20. Apparatus 320 is placed in a stationary position relative to the user's head. As shown in the embodiment of FIGS. 7–8, apparatus 320 may be suspended above the user for tracking positional and rotational movement of the user's head. Thus, rotation of the user's head along the Y axis, e.g., by spinning in a swivel chair, is yaw rotation. Rotation of the user's head along the X axis, e.g., by nodding side to side, is pitch rotation. Rotation of the user's head along the Z axis, e.g., by nodding back and forth, is roll rotation. Alternative orientations (e.g., as set forth in Appendix B) may be employed.

In an alternative embodiment, the tracker may be disposed along the face of a user, for example, in the form of eyeglasses having three microphone elements. In this case, the transmitter apparatus will be positioned in front of the user (e.g., as shown in FIG. 5).

Figure 9:
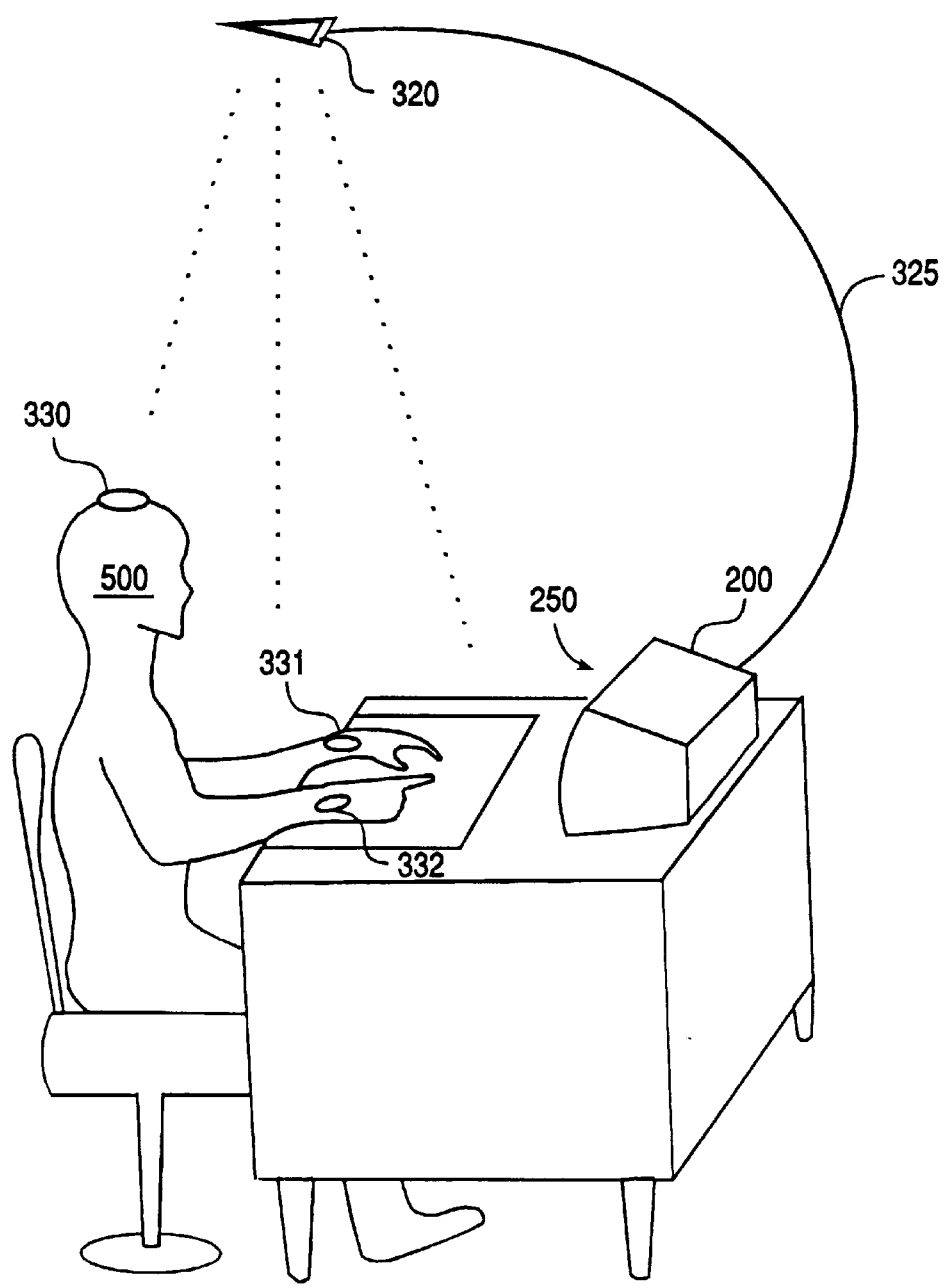
FIG. 9 is a lateral view of yet another embodiment of the present invention which includes body tracking apparatus.

While the foregoing embodiments (e.g., devices 100, 150, 300) have been described with reference to tracking a single pointer or mouse in space, the present invention (particularly, system 150') is also capable of tracking multiple pointers in space with a single transducer frame. As shown in FIG. 9, for example, microphone apparatus may be placed on the user's head 500, e.g., head tracker 330, as well as on each arm, e.g., hand trackers 331, 332. Each tracker includes at least three microphone elements (e.g., elements 31, 32, 33) for receiving acoustic signals from the transducer 320. Other body parts may be tracked by placing tracking or pointing member accordingly.

This may be used advantageously in computer-aided design applications where an operator may select objects on a display (virtual environment) independent of overall movement. Thus, the user may move or navigate within a virtual space (virtual reality applications) using the head tracker 330 while hand trackers 331, 333 are used to effect operations, such as manipulating objects, within that space.

While the invention is described in some detail with specific reference to a preferred embodiment and certain alternatives, there is no intent to limit the invention to that particular embodiment or those specific alternatives. Those skilled in the art, for example, will appreciate that other transmitted signals, such as infrared, radiowaves, and the like, may be employed for detection. The true scope of the invention is defined not by the foregoing description but by the following claims.

What is claimed is:

1. A hand-held pointer system for a computer having a display comprising:

a transmitter for transmitting signals from a stationary location;

a pointer including three receivers for receiving said transmitted signals;

a hand-held housing incorporating said pointer, said housing being movable in 3D space and rotatable about x, y and z axes;

a control circuit, operably coupled to the transmitter and the pointer for providing the computer a position of said pointer relative to said stationary location and an attitude corresponding to each of the x, y and z rotation of said housing, whereby a position indicator on said display is altered in accordance with said position and said attitude, both said position and said attitude being determined from the signals from said three receivers;

an output port of said pointer for coupling to an input port of a computer, said output port including a plurality of analog control lines;

a plurality of switches;

a plurality of impedances, each impedance coupled to one of said switches to form a combination of a switch and an impedance;

a plurality of the combinations of a switch and an impedance being coupled to one of said analog control lines;

at least a first user input button, mounted on said hand-held housing and coupled to at least one of said switches;

whereby an actuation of different ones of said switches provides different signal levels on said control line indicating which switches are actuated;

means in said computer for interpreting said different signal levels to modify the display of said cursor or viewpoint;

a second user input button;

means, operably coupled to the second user input button, for suspending the sending of position information in response to a signal from said second user input button;

means for resuming the sending of position information in response to a second signal from said second user input button, after movement of said pointer, whereby a position indicator on said display is frozen in accordance with said suspending, and resumes from the frozen position in response to said resuming, regardless of the actual position of said pointer at the time of resuming;

a third user input button;

a microphone mounted in said pointing device, operably coupled to the third user input button for receiving audible audio input in response to a signal from said third user input button;

wherein said microphone in the absence of said signal from said third user input button receives ultrasonic position information; and means for suspending the sending of position information from said microphone to said computer in response to said signal from said third user input button.

* * * * *